(12) United States Patent
Lafler et al.

(10) Patent No.: US 6,244,296 B1
(45) Date of Patent: Jun. 12, 2001

(54) POSITION DETECTION FOR ROTARY CONTROL VALVES

(75) Inventors: Lawrence R. Lafler; Douglas J. Tanner, both of St. Cloud; Val DiEullis; Vernon M. Cottles, both of St. Paul, all of MN (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/256,050

(22) Filed: Feb. 23, 1999

(51) Int. Cl.[7] .................................................. F16K 37/00
(52) U.S. Cl. ................. 137/554; 324/207.12; 324/207.2; 324/207.21; 324/207.25
(58) Field of Search ....................... 137/554; 324/207.12, 324/207.2, 207.21, 207.25

(56) References Cited

U.S. PATENT DOCUMENTS

| | | |
|---|---|---|
| 3,602,254 * | 8/1971 | Fawkes ................ 137/554 |
| 4,148,215 | 4/1979 | Hofstetter, Jr. . |
| 4,225,112 | 9/1980 | Libke . |
| 4,225,113 | 9/1980 | Barthelemy et al. . |
| 4,225,114 | 9/1980 | Barthelemy et al. . |
| 4,256,285 | 3/1981 | Davidson . |
| 4,260,129 | 4/1981 | Groenefeld . |
| 4,281,818 | 8/1981 | Cunningham et al. . |
| 4,344,632 | 8/1982 | Green et al. . |
| 4,392,375 | 7/1983 | Eguchi et al. . |
| 4,396,199 | 8/1983 | Boyd et al. . |
| 4,397,331 | 8/1983 | Medlar . |
| 4,398,696 | 8/1983 | Szilagyi et al. . |
| 4,483,513 | 11/1984 | Summers . |
| 4,487,216 | 12/1984 | Barker et al. . |
| 4,519,583 | 5/1985 | Lapinoja . |
| 4,558,605 | 12/1985 | Tanner . |
| 4,570,118 | 2/1986 | Tomczak et al. . |
| 4,589,628 | 5/1986 | Barker et al. . |
| 4,601,211 * | 7/1986 | Whistler ................ 137/554 X |
| 4,893,502 * | 1/1990 | Kubota et al. ................ 324/207.2 X |
| 5,148,106 | 9/1992 | Ozawa . |
| 5,251,148 | 10/1993 | Haines et al. . |
| 5,261,451 * | 11/1993 | Spencer ................ 137/554 |
| 5,332,965 | 7/1994 | Wolf et al. . |
| 5,497,081 | 3/1996 | Wolf et al. . |
| 5,512,820 | 4/1996 | Alfors . |
| 5,564,470 * | 10/1996 | Denmark et al. ................ 137/554 |
| 5,570,015 | 10/1996 | Takaishi et al. . |
| 5,579,800 | 12/1996 | Walker . |
| 5,609,184 * | 3/1997 | Apel et al. ................ 137/554 |
| 5,650,721 | 7/1997 | van den Berg et al. . |
| 5,789,917 * | 8/1998 | Oudet et al. ................ 324/207.2 |
| 5,880,586 * | 3/1999 | Dukart et al. ................ 324/207.2 |

OTHER PUBLICATIONS

DeZurik Brochure No. 071097 entitled "Precision Electric Control Valves" (1989).

DeZurik Brochure No. 081198 entitled "ICoT® Smart Positioners" (Dec. 1997).

ICoT Prior Art Brochure entitled "Smart Positioner" (publication date unknown).

Honeywell Press Release dated Jul. 21, 1997 and downloaded from Honeywell webpage.

(List continued on next page.)

*Primary Examiner*—John Rivell
(74) *Attorney, Agent, or Firm*—Pepper Hamilton LLP

(57) ABSTRACT

A rotary control valve includes a flow control element having a lower valve shaft rotatably received in a nonmagnetic body portion. A magnet is coupled with a lower valve shaft and rotatable therewith to produce an external magnetic field that varies in accordance with the angular position of the flow control element. A magnetic field detector, positioned in the external magnetic field, is operable to detect the external magnetic field and to produce position signals representative thereof, such being indicative of the angular position of the flow control element.

22 Claims, 4 Drawing Sheets

OTHER PUBLICATIONS

Honeywell Catalog Excerpt No. 900205, Revision A, entitled "1 & 2 Axis Magnetoresistive Microcircuits" (Oct., 1997).

Sensycon Operator's Manual excerpt depicting prior art rotary shaft position sensor in a valve (publication date unknown).

* cited by examiner

POSITION DETECTION FOR ROTARY CONTROL VALVES

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

This invention pertains generally to methods and devices for sensing angular positions and, more particularly, to methods and devices for detecting and providing feedback of the angular position of a rotary control valve.

2. Description of the Prior Art

Rotary control valves, such as butterfly valves or ball valves, include a valve body and a plate, ball, or other flow control member rotatably mounted in the valve body to either block fluid flow through the valve, or allow fluid flow through the valve, depending upon the angular position of the flow control member. For example, a ball valve includes a ball which is securely mounted to upper and lower portions of a valve shaft. The ball is mounted in the fluid flow path of the valve by mounting the lower portion of the valve shaft in a lower portion of the valve body and the upper portion of the valve shaft in an upper portion of the valve body, with the ball positioned between the upper and lower shaft portions in the fluid flow path of the valve. An actuator is attached to the upper portion of the valve shaft, which extends through the valve body. When the actuator is turned, the valve shaft, and, therefore, the valve ball, is rotated. The ball is shaped, i.e., portions of the ball are removed or grooves are formed therein, such that when the ball is rotated, through, e.g., 90°, the fluid flow path through the valve is gradually opened or closed.

It is often desirable to determine accurately the angular position of the ball within the ball valve, and therefore, the state, i.e., open, closed, or somewhere in between, of the valve. Several methods of automatically determining the angular position of a valve are known. Sensing the angular position of the valve may be accomplished by attaching an angular position sensor to the valve actuator. For example, magnets may be attached to the rotating member of the valve actuator, and a Hall effect sensor used to determine the position of the actuator as the actuator member, therefore, the magnets attached thereto, is rotated. As the actuator member is rotated, the magnetic field produced by the magnets attached to the actuator is also rotated. The Hall sensor is placed within the magnetic field produced by the magnets. As the direction of the magnetic field changes, as the actuator is rotated, the Hall effect sensor detects the change and provides a signal from which the rotary position of the actuator can be determined.

Alternatively, a cam may be attached to the actuator shaft. The angular position of the actuator shaft is then converted to an electrical signal by an inductive sensor connected or in close proximity to the cam. As the actuator is rotated, the cam attached thereto is also rotated, which, in turn, changes the inductance of the inductive sensor in contact with or in close proximity to the cam. Thus, a signal is provided by the inductive sensor which is related to the angular position of the actuator and from which the angular position of the actuator can be determined.

As a third alternative, a potentiometer may be connected to the rotating member of the valve actuator. As the actuator member is rotated, the potentiometer potential is changed. This change in potential can be detected and signal derived therefrom from which the angular position of the actuator can be determined.

All known methods for determining the angular position of a valve by mounting a rotary position sensor on the valve actuator, however, suffers from a serious limitation. For a ball valve, for example, an accurate determination of the rotary position of the valve ball is desired. Although the valve actuator is connected, via the valve shaft, to the valve ball, there could be some inherent looseness in this connection. Even if the connection between the valve actuator and the ball is initially tight, this connection can fail or become looser with time. Thus, sensing the angular position of the valve actuator will not necessarily translate into an accurate indication of the position of the valve flow control member.

In order to determine the angular position of the flow control member more accurately, the angular position sensing methods described above have been employed to sense the position of the lower portion of the valve shaft which is directly connected to the flow control member. Since the shaft is directly and tightly connected to the flow control member, sensing the angular position of the shaft will result in an accurate determination of the angular position of the flow control member itself. Any of the angular position sensing methods described above may be used to determine the angular position of the valve shaft. For example, a magnet may be attached to the lower portion of the valve shaft, and a Hall sensor placed near the magnet. As the valve shaft, and, therefore, the flow control member itself, rotates, the magnetic field produced by the magnet attached to the valve shaft changes direction. This change in direction is detected by the Hall effect sensor, which provides a signal related to the angular position of the angular shaft member from which the angular position of the flow control member can be determined accurately.

Alternatively, a potentiometer can be attached to the lower portion of the valve shaft. As the shaft, and, therefore, the flow control member itself, is rotated, the potential of the potentiometer is changed. This change can be sensed, and a signal provided from which the angular position of the flow control member can be determined accurately.

Although measuring the angular position of a flow control member by sensing the angular position of the lower portion of the valve shaft can achieve accurate results, known methods for making such measurements suffer from other limitations. In order to measure the movement of the lower portion of the valve shaft, with a potentiometer or another device, the lower portion of the valve shaft must be extended through the bottom of the valve, and the potentiometer or other measurement device attached to the shaft on the outside of the valve. Extending the lower portion of the valve shaft thus provides another leak path from the valve, and the added packing adds friction to the valve. Also, extending the lower portion of the shaft through the valve body makes the valve more fragile during moving and handling of the valve.

As an alternative to extending the lower portion of the valve shaft through the valve body, the potentiometer or other device for sensing angular position of the shaft may be extended through an aperture in the valve body near the end of the shaft. For example, a potentiometer may be mounted on the outside of the valve body. An elongated shaft attached to the potentiometer may be extended through an aperture in the valve body wall and be connected to the lower portion of the valve shaft. Alternatively, a Hall effect device may be mounted within the valve body, near a magnet placed on the flow control member or lower portion of the valve shaft, with conducting wires for conducting the signal provided by the Hall effect sensor passing through a hole in the valve body. In either case, the addition of another aperture to the valve body provides another potential leak path from the valve, and therefore, adversely affects valve integrity.

Another limitation of Hall effect and other magnetic field sensors employed to detect the angular position of the lower shaft of a rotary control valve is the effect of temperature changes on the accuracy of such devices. Changes in temperature of the magnet mounted on the lower portion of the valve shaft and the magnetic field sensing device itself can affect the signal provided by the sensor. Temperature changes, can, therefore, affect the accuracy of the angular position sensed by such a detector unless temperature compensation is provided.

SUMMARY OF THE INVENTION

The present invention provides for accurate detection of the angular position of a valve flow control member in a rotary control valve using magnets mounted in the bottom end of the lower portion of a valve shaft, which is tightly connected to the flow control member, and a magnetic field sensor, mounted outside of the valve pressure boundary, for detecting changes in the magnetic field produced by the magnets as the valve flow control member is rotated. Since, in this manner, the angular position of the lower valve shaft is determined directly, and since the lower valve shaft is tightly connected to the flow control member, the present invention provides a highly accurate determination of the angular position of the valve flow control member. Furthermore, since angular position detection in accordance with the present invention employs magnets which are mounted entirely within the valve, and a magnetic field sensor which is mounted entirely outside of the valve, the present invention allows accurate angular position detection to be achieved without the need for providing another hole through the valve, which would add another leak path from the valve, require additional packing, and make the valve more fragile.

In accordance with a first embodiment of the present invention a rotary control valve includes a ball, disk, or other flow control member, which is tightly connected to a valve shaft. The lower portion of the valve shaft is mounted on the inside of a lower portion of the valve wall. In accordance with the present invention, the lower portion of the valve shaft is made of a non-magnetic material, and has two magnets retained in cavities formed on each side of and extending parallel to the axis of rotation of the valve shaft. The magnets are oriented such that the north pole of one of the magnets and the south pole of the other magnet are near the bottom end of the valve shaft. A plate of ferrous material may be used to connect the other, upper, ends of the magnets through an opening in the valve shaft which extends between the cavities in which the magnets are retained. The purpose of the plate of ferrous material is to increase the strength of the magnetic field created between the lower ends of the magnets near the bottom of the lower portion of the valve shaft. An arching magnetic field is thus produced between the lower poles of the magnets at the bottom of the lower portion of the valve shaft. This arching magnetic field extends beyond the end of the valve shaft, and through the lower portion of the valve wall that is in close proximity to the end of the shaft. The lower portion of the valve wall penetrated by the magnetic field is made of a non-magnetic material.

A magnetic field sensor, such as a giant magneto resistive (GMR) sensor or a Hall effect sensor, is placed in the magnetic field created by the magnets on the outside, or unpressurized side, of the non-magnetic lower portion of the valve wall. The output signal provided by the magnetic field sensor is dependent on the strength and direction of the magnetic field in which the sensor is placed. As the lower portion of its valve shaft, and, therefore, the valve flow control member, is rotated, a sensor signal provided by the magnetic field sensor varies as the angular position of the magnets mounted in the lower portion of the valve shaft varies. Thus, the signal produced by the magnetic field sensor indicates the angular position of the valve flow control member. The sensor signal produced by the magnetic field sensor can be converted by a signal conditioner into an analog or digital signal format. This signal can be processed and transmitted to a position attached to or near the valve for accurate control of the valve flow control member position, and/or can be displayed at a local or remote location.

In an alternative embodiment of the present invention, the lower valve shaft, which is tightly connected to the valve flow control member, contains a cylindrical opening formed therein extending from the bottom of the shaft and centered on the axis of rotation of the shaft. Magnets are placed in two recesses formed in the shaft on opposite sides of the cylindrical opening. The magnets are placed in the recesses such that opposite poles point toward each other across the cylindrical opening to create a magnetic field within the cylindrical opening. A lower portion of the valve wall is formed to include an extension which extends into the cylindrical opening in the lower valve shaft. This lower portion of the valve wall is made of a non-magnetic material. A cavity is formed in the extending portion of this non-magnetic lower portion of the valve wall, on the outside of the valve wall, such that the magnetic field produced by the magnets in the valve shaft is also present within the cavity. A magnetic field sensor, such as a magneto-resistive sensor or a Hall effect sensor is placed in the magnetic field within the cavity. The magnetic field sensor produces a sensor signal which is dependent on the strength and direction of the magnetic field in which the sensor is mounted. Thus, as the lower portion of the valve shaft, and therefore, the flow control member, rotates, the sensor signal provided by the magnetic field sensor varies as the angular position of the magnets mounted in the valve shaft changes. Thus, the sensor signal provided by the magnetic field sensor provides an accurate indication of the angular position of the valve flow control member. The sensor signal can be converted by a signal conditioner into any analog or digital format, processed, and transmitted to a position attached to or near the valve to accurately control the position of the valve flow control member, and/or to the local or remote location for display.

The accuracy of rotary valve angular position detection in accordance with the present invention is improved by making the detection of the angular position of the valve flow control member insensitive to temperature changes in the magnets mounted in the lower valve shaft and the magnetic field strength sensor employed. This is achieved by using two magnetic field sensors mounted on the outside of the lower portion of the valve wall within the magnetic field produced by the magnets mounted in the lower valve shaft. The magnetic field sensors are mounted on the valve such that the active axes of the two sensors are oriented in the same plane but angularly displaced from each other. By combining the sensor signals provided by the two magnetic field sensors, the angular position of the valve flow control member can be calculated in a manner in which the first order dependence of position signal versus temperature is canceled out. Thus, in accordance with the present invention, the angular position of a flow control member in a rotary control valve can be determined under various temperature conditions.

Further objects, features and advantages of the present invention will be apparent from the following detailed description taken in conjunction with the accompanying drawings.

DETAILED DESCRIPTION OF THE PREFERRED EMBODIMENT

The present invention provides accurate position detection for a rotary control valve. The present invention may be applied to any type of rotary control valve, such as a ball valve, a butterfly valve, or a plug valve, having any type of rotatable flow control member, such as a ball, disk, or plug. For exemplary purposes only, the present invention will be described with reference to application to a ball type rotary control valve.

Figure 1:
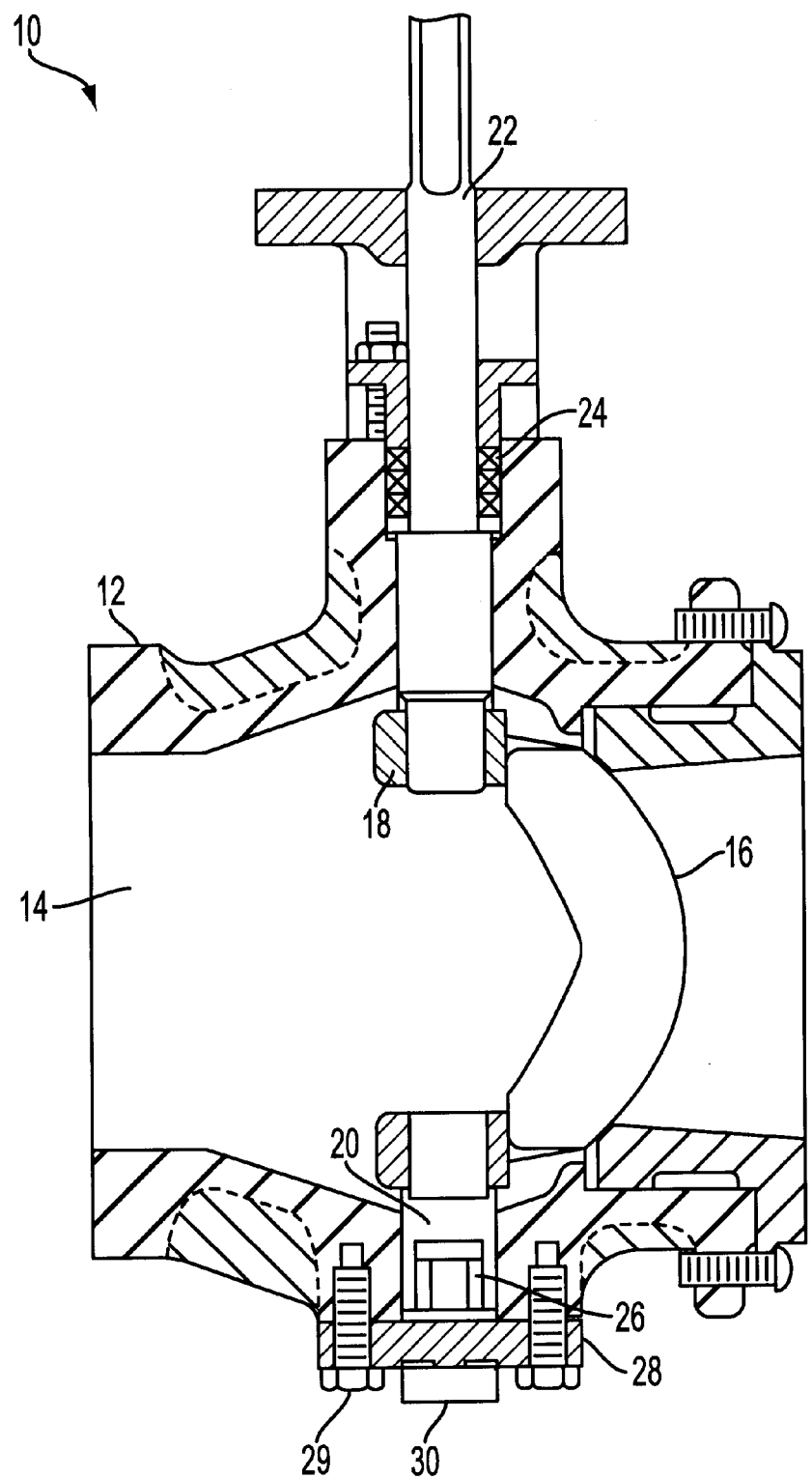
FIG. 1 is an illustration, in cross-section, of an exemplary rotary control valve including angular position detection in accordance with the present invention.

An exemplary ball type rotary control valve 10 incorporating angular position detection in accordance with the present invention is illustrated in and will be described in detail with reference to FIG. 1. The exemplary rotary control valve 10 includes a valve body 12 having a fluid flow path 14 therethrough. A rotatable flow control member 16, in this case a ball, is mounted within the valve body 12 in the fluid flow path 14 of the valve 10. The ball 16 is rotatable, e.g., through 90° arc, between fully open and fully closed positions. In the fully closed position, as illustrated in FIG. 1, the ball 16 entirely blocks the fluid flow path 14 through the valve 10. The ball 16 is mounted on a valve shaft having upper 18 and lower 20 portions. The upper 18 and lower 20 portions of the valve shaft are, in turn, mounted in the valve body 12 for rotational movement therein. The valve shaft 18 extends through the upper portion of the valve body 12. Packing 24 is placed around the valve shaft 18 where it extends through the valve body 12, to prevent leakage from the inside of the valve to the outside thereof around the shaft 18. When the shaft 18 is rotated, either by hand or by some other mechanism, the ball 16 is rotated to open and close the fluid flow path 14 through the valve 10.

The lower portion 20 of the valve shaft is tightly coupled to the valve ball 16. Therefore, the angular position of the valve ball 16 can be determined accurately from the angular position of the lower portion 20 of the valve shaft. In accordance with the present invention, accurate position detection of the valve ball 16 is achieved, therefore, by mounting magnets 26 in the lower portion 20 of the valve shaft. The magnets 26 are mounted in the lower portion 20 of the valve shaft so as to create a magnetic field which extends outside of the valve body 12. The lower portion of the valve shaft 20 and a lower portion 28 of the valve body 12 are made of non-magnetic materials which do not interfere with the magnetic field created by the magnets 26. Note that the non-magnetic lower portion 28 of the valve body 12 may be formed as a separate piece of non-magnetic material which is tightly attached, via bolts 29, screws, or another mechanism to the bottom of the valve body 12 adjacent the lower portion 20 of the valve shaft.

A magnetic field sensor 30 is mounted on the outside or within a cavity of the non-magnetic portion 28 of the valve body 12, within the magnetic field created by the magnets 26. The magnetic field sensor 30 may be implemented as a Hall effect sensor, or as a magneto-resistive sensor, such as a GMR sensor manufactured and sold by Non-Volatile Electronics, Inc. of Eden Prairie, Minn. The magnetic field sensor 30 produces an output signal which depends on the strength and direction of the magnetic field passing through the sensor. Thus, as the valve ball 16, and therefore, the lower portion of the valve shaft 20 rotates, the magnetic field produced by the magnets 26 mounted in the lower portion of the valve shaft 20 also rotates, and the sensor signal provided by the magnetic field sensor 30 varies with the angular position of the magnets 26. Thus, the signal produced by the magnetic field sensor indicates the angular position of the valve ball 16. The sensor signal produced by the magnetic field sensor 30 may be converted by a signal conditioner into any analog or digital format which may be processed and/or displayed in a conventional manner.

Figure 2:
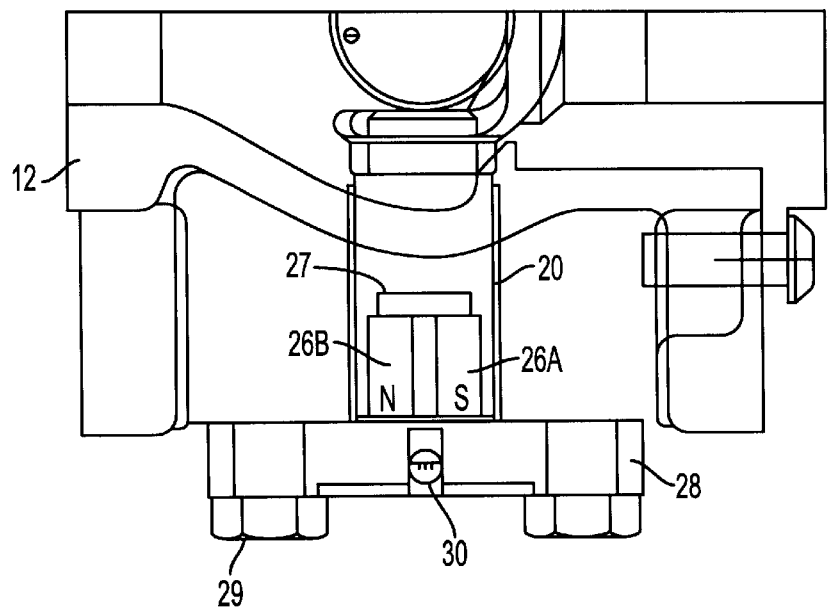
FIG. 2 is a detailed side view, in partial cross-section, of a portion of an exemplary rotary control valve incorporating position detection in accordance with a first embodiment of the present invention.
Figure 3:
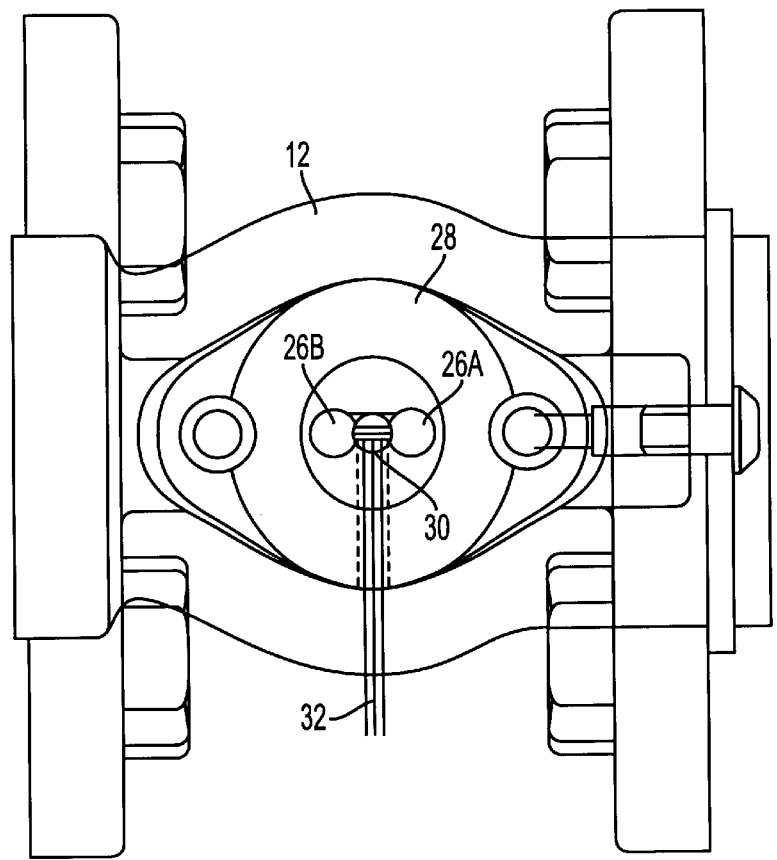
FIG. 3 is a bottom view of the portion of the exemplary rotary control valve of FIG. 2.

FIGS. 2 and 3 illustrate, in more detail and by example, the mounting of the magnets 26 in the lower portion 20 of the valve shaft in an exemplary embodiment of the present invention. The lower valve shaft 20, which is made of a non-magnetic material, has two magnets 26a and 26b mounted therein in parallel cavities formed near the bottom end of the lower valve shaft 20. The two magnets 26a and 26b are thus mounted in the lower portion of the valve shaft 20 in parallel both with each other and with the axis of rotation of the valve shaft. The magnets 26a and 26b are oriented such that the north pole of one of the magnets and the south pole of the other of the magnets are nearest the end of the lower portion of the valve shaft 20. A plate of ferrous material may be mounted in the lower portion 20 of the valve shaft to connect the other, upper ends of the magnets 26a and 26b together. The piece of ferrous material 27 acts to increase the strength of the magnetic field produced between the lower ends of the magnets 26a and 26b. In the position illustrated in FIGS. 2 and 3, the magnets 26a and 26b produce an arcing magnetic field between their lower poles. This arcing magnetic field extends beyond the end of the lower portion of the valve shaft 20 and into or through the non-magnetic lower portion 28 of the valve body 12.

The magnetic field sensor 30 is mounted either within or on the non-magnetic lower portion 28 of the valve body, within the arcing magnetic field produced by the magnets 26a and 26b. As discussed previously, as the lower portion of the valve shaft 20 is rotated, the magnetic field produced by the magnets 26a and 26b is also rotated. As the direction of the magnetic field changes, the output signal produced by the magnetic field strength sensor 30 also changes. Since the lower portion of the valve shaft 20 is tightly connected to the valve ball 16, the angular position of the valve ball 16 can be accurately determined from the signal produced by the magnetic field strength sensor 30. The signal produced by the magnetic field strength sensor 30 may be provided on a line 32 to a remote processor and/or display system, wherein the angular position of the valve ball 16 may be displayed to a user and/or may be used as feedback to an automated mechanism for opening and closing the valve ball 16 via a valve shaft 18.

Figure 4:
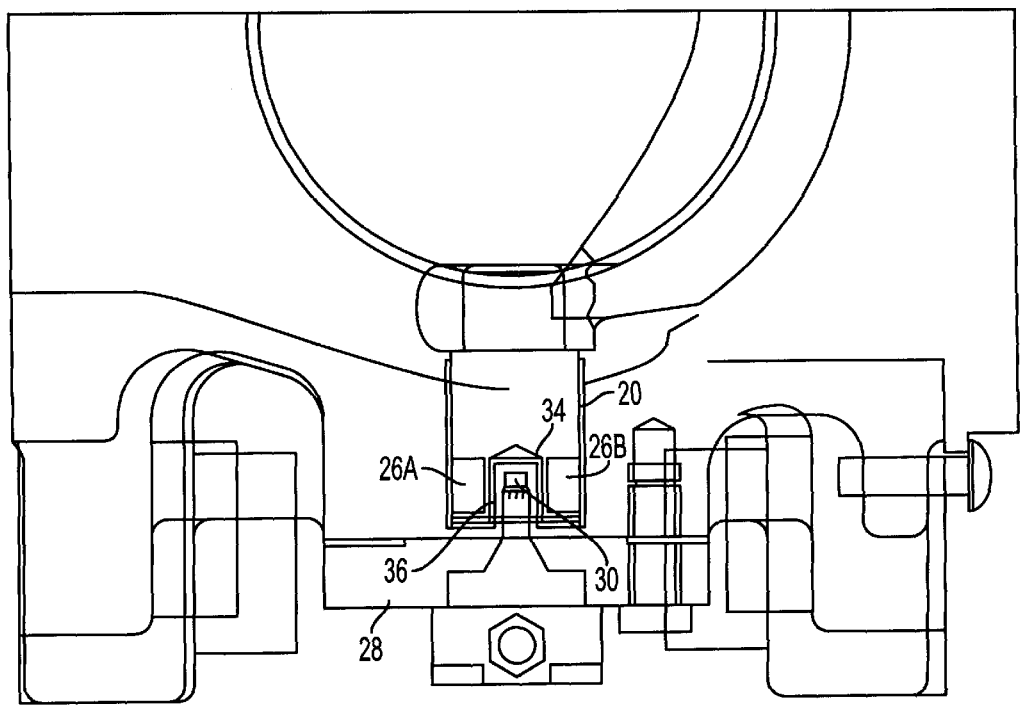
FIG. 4 is a detailed illustration, in partial cross-section, of a portion of an exemplary rotary control valve incorporating angular position detection in accordance with a second embodiment of the present invention.

An alternative exemplary embodiment of a rotary control valve incorporating angular position detection in accordance with the present invention is illustrated in and will be described in detail with reference to FIG. 4. In this case, the lower portion of the valve shaft 20, which is made of a non-magnetic material and which is tightly connected to the valve ball, has a cylindrical opening 34 formed therein extending from the bottom of the lower portion of the valve shaft 20 and centered on the axis of rotation of the lower portion of the valve shaft 20. Two magnets 26a and 26b are mounted in recesses on opposite sides of the lower portion of the valve shaft 20. The magnets 26a and 26b are mounted in the lower portion of the valve shaft 20 such that opposite poles of the magnets 26a and 26b point toward each other across the cylindrical opening 34 in the valve shaft 20, to create a magnetic field within the cylindrical opening 34. The lower portion of the valve body 28, which is also made of a non-magnetic material, includes an extending portion 36 which extends into the cylindrical opening 34 in the lower portion of the valve shaft 20. The extending portion 36 of the lower portion of the valve body 28 forms a cavity on the outside of the valve body which also extends into the cylindrical opening 34 formed in the lower portion of the valve shaft 20, such that the magnetic field created by the magnets 26a and 26b is present in this cavity. The magnetic field sensor 30 is mounted within this cavity, on the outside of the valve body, within the magnetic field created by the magnets 26a and 26b. As discussed previously, as the valve ball, and, therefore, the lower portion of the valve shaft 20 is rotated, a signal provided by the sensor 30 will vary as the direction of the magnetic field detected by the sensor 30 changes. 10 As described previously, this signal may be processed and displayed in a conventional manner, and/or used as feedback to control an automatic valve control mechanism connected to the valve shaft.

The angular position signal provided by the magnetic field sensor 30 is sensitive to changes in temperature in the magnets 26 mounted in the lower portion of the valve shaft 20, and changes in temperature of the sensor 30 itself. These changes may be caused, for example, by changes in temperature of the fluid flowing through or contained by the valve 10. These temperature caused changes in the output of the sensor 30 can adversely affect the accuracy of the detected angular position of the valve ball. In accordance with the present invention, accurate angular position detection using magnetic field sensing is made temperature insensitive by the use of two magnetic field sensors.

Figure 5:
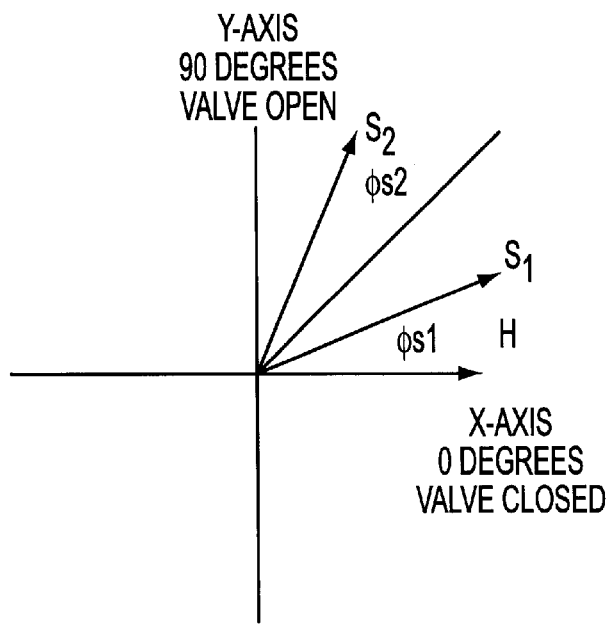
FIG. 5 illustrates the preferred angular relationship between the active axes of two magnetic field sensors used for temperature insensitive angular position detection of a rotary control valve in accordance with the present invention.

Assume that the lower portion of the valve shaft 20 is rotatable through a 90° arc from 0° (valve closed) to 90° (valve open). The two 25 magnetic field sensors preferably are mounted such that their active axes are aligned at equal angles between 0 and 45° on opposite sides of the halfway angle of rotation (e.g., 45°) of the lower portion of the valve shaft. Thus, assume that the first sensor is oriented at some angle, $\phi_1$, between 0° and 45°. The second sensor is oriented at an angle $\phi_2$, between 45° and 90°. The two sensor angles preferably satisfy the equation 45°−$\phi_1$=$\phi_2$−45°. relationship is illustrated in FIG. 5, i.e., $\phi_1 + \phi_2 = 90°$ or complementary angles.

Figure 6:
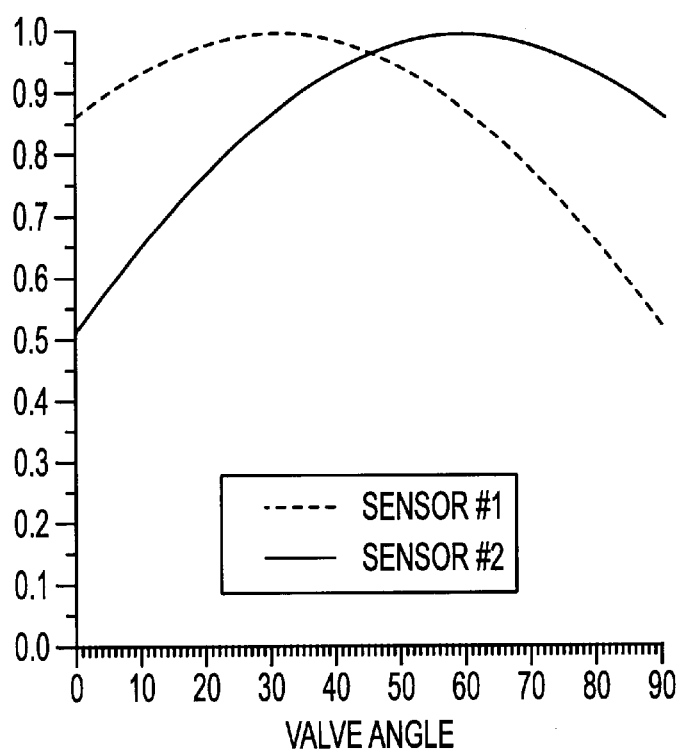
FIG. 6 is a graph of exemplary output voltage profiles for two magnetic field sensors used for temperature insensitive angular position detection in accordance with the present invention.

As the valve ball is rotated, the direction of the magnetic field with respect to the active axes of the magnetic field sensors changes. For the case in which the sensors are mounted at angles $\phi_1 = 30.6°$ and $\phi_2 = 59.4°$, exemplary output voltages for the two sensors as the valve angle changes from 0° to 90° are illustrated in the profile of FIG. 6. The alignment of the two sensors in the manner described avoids the zero field condition, which is a problem region in some magnetic field sensors, such as magneto-resistive sensors.

From the output signals provided by the two magnetic field sensors, the valve angle can be calculated. A mathematical derivation of the valve angle as a function of two sensor voltages uses the following relationships for the two sensor voltages:

$$V_1 = S_{nom} \cdot H_{nom} \cdot [1 + \sigma_1 \cdot T_S] \cdot [1 + \eta T_M] \cdot \cos(\Theta_{v-\phi 1} + \phi_{e1}) + V_{ofs1} + V_{n1} \quad (1)$$

$$V_2 = S_{nom} \cdot H_{nom} \cdot [1 + \sigma_2 \cdot T_S] \cdot [1 + \eta T_M] \cdot \cos(\theta_v - \phi_2 + \phi_{e2}) + V_{ofs2} + V_{n2} \quad (2)$$

Assume the following:

| | |
|---|---|
| $\sigma_1 = \sigma_2$ | (The tempcos for the two sensors are identical.) |
| $\phi_{e1} = \phi_{e2} = 0$ | (There is no error in sensor's orientation.) |
| $V_{ofs1} = V_{ofs2} = 0$ | (Adjusted during calibration.) |
| $V_{n1} = V_{n2} = 0$ | (Noise-free analysis.) |

These assumptions are made to simplify the analysis in order to illustrate the basic measurement procedure and its advantages. The calculation of the valve angle is now derived as $$\theta_v = \arctan\left[\frac{\cos(\phi_2) \cdot V_1 - \cos(\phi_1) \cdot V_2}{\sin(\phi_1) \cdot V_2 - \sin(\phi_2) \cdot V_1}\right], \quad (16)$$

Note that by calculating the valve angle in the manner described, the temperature dependence of the magnetic field sensor and the magnets has been canceled by the formation of a tangent function. Thus, the need for further temperature compensation of the sensor's signal is eliminated. Thus, in accordance with the present invention, highly accurate angular position detection can be achieved for various changing operating temperatures.

It is understood that the invention is not confined to the particular examples and embodiments herein illustrated and described, but embraces all such modified forms thereof as come within the scope of the following claims.

What is claimed is:

1. A valve comprising:
    a valve body having walls defining a flow path therethrough;
    a flow control element;
    a mounting structure coupled with said flow control element and rotatably mounting said element in said flow path for rotation therein through a plurality of angular positions, said mounting structure including a first valve shaft extending through said body and an opposed, second valve shaft rotatably received in a body portion within said body without projecting externally beyond the walls; and an angular position sensor including at least one magnet coupled with said second valve shaft and rotatable therewith, said magnet being configured and positioned to present an external magnetic field at a location outside said valve body and adjacent said body portion, the apparent strength of said external magnetic field at said location being correlated with the angular position of said second valve shaft and thereby with said flow control element, a magnetic field detector positioned in said external magnetic field at said location, operable to detect the strength of said external magnetic field, and operable to produce angular position signals representative thereof, such being indicative of the angular position of said flow control element.

2. The valve of claim 1, said angular position sensor including two spaced magnets positioned within said second valve shaft.

3. The valve of claim 2, the north pole of one of said magnets being oriented adjacent the south pole and the other of said magnets.

4. A valve comprising:

a valve body having walls defining a flow path therethrough;

a flow control element;

mounting structure coupled with said flow control element and rotatably mounting said element in said flow path for rotation therein through a plurality of angular positions, said mounting structure including a first valve shaft extending through said body and an opposed, second valve shaft rotatably received in a body portion within said body and an angular position sensor including at least one magnet coupled with said second valve shaft and rotatable therewith, said magnet being configured and positioned to present an external magnetic field at a location outside said valve body and adjacent said body portion, the apparent strength of said external magnetic field at said location being correlated with the angular position of said second valve shaft and thereby with said flow control element, a magnetic field detector positioned in said external magnetic field at said location, operable to detect the strength of said external magnetic field, and operable to produce angular position signals representative thereof, such being indicative of the angular position of said flow control element, said angular position sensor including two spaced magnets positioned within said second valve shaft, the north pole of one of said magnets being oriented adjacent the south pole and the other of said magnets, said magnets presenting respective first ends positioned adjacent said body portion and respective second ends inboard thereof, said sensor including a ferromagnetic strap magnetically coupling said second ends.

5. The valve of claim 2, said sensor including two of said detectors, each being subject to changes in sensitivity due to temperature, said sensors being positioned with respective angular orientations offset from one another sufficiently to reduce the effect of temperature changes on sensor accuracy.

6. The valve of claim 5, said detectors being operable to produce position signals as respective voltage signals $V_1$ and $V_2$, said angular position of said flow control elements being represented by $$\theta_v = \arctan\left[\frac{\cos(\phi_2) \cdot V_1 - \cos(\phi_1) \cdot V_2}{\sin(\phi_1) \cdot V_2 - \sin(\phi_2) \cdot V_1}\right], \quad (16)$$

where $\phi_1$ and $\phi_2$ are the respective angular orientations of said detectors.

7. The valve of claim 1, said body portion being composed of non-magnetic material.

8. The valve of claim 1, said sensor including a Hall effect sensor.

9. The valve of claim 1, said sensor including a GMR sensor.

10. The valve of claim 1, said second shaft presenting a tubular configuration opening toward said body portion and presenting an interior surface, said body portion including a tubular, outwardly opening insert section received in said second valve shaft allowing rotation of said second valve shaft about said insert section, said sensor being received in said insert section and thereby within said second valve shaft, said magnet being mounted to the interior surface of said second valve shaft.

11. The valve of claim 10, said sensor including two of said magnets positioned on said interior surface of said second valve shaft.

12. The valve of claim 1, said second valve shaft being composed of non-magnetic material.

13. A valve comprising:

a valve body including walls defining an internal flow path extending between inlet and outlet openings;

a flow control element rotatably positioned within the path;

an angular position sensor comprising at least one measured component coupled with the flow control element and rotatable therewith, the measured component being located internally of the valve body and operable to present a measurable characteristic at a location outside the valve body without piercing the walls, with the measured value of the characteristic being correlated with the angular position of the measured component and thereby with the angular position of the flow control element, and at least one measuring component located outside the valve body and operable and positioned to make without piercing the walls at least one measurement of the characteristic presented by the measured component, the measuring component being further operable to produce based upon the measurement a signal indicative of the angular position of the measured component, such being indicative of the angular position of the flow control element; and a mounting structure coupled to the flow control element and configured to rotatably mount the flow control element in the flow path, the mounting structure having a first portion that projects externally beyond the walls and a second portion wholly located internally of the walls, the measured component being coupled to the second portion.

14. The mounting structure of claim 13, at least one of the portions being a valve shaft that is fixed to the flow control element and rotatably supported by the valve body.

15. The valve of claim 13, the measured component being operable to present a magnetic field and the measuring component being operable to detect the magnetic field.

16. A method for determining the angular orientation of a rotatable element, the method comprising the steps of:

(a) coupling at least one magnet to the rotatable element, the magnet being rotatable with the rotatable element and operable to present a magnetic field;

(b) locating a first sensor so as to provide it with an angular orientation $\phi_1$ relative to a reference axis, and operable to detect the apparent strength of the magnetic field and to produce a signal $V_1$ which is indicative thereof;

(c) locating a second sensor so as to provide it with an angular orientation $\phi_2$ relative to the reference axis, and operable to detect the apparent strength of the magnetic field and to produce a signal $V_2$ which is indicative thereof;

(d) determining the angular orientation of the magnet and thereby the rotatable element using the following formula, where the angular orientation of the rotatable element is $\theta_v$, $$\theta_v = \arctan\left[\frac{\cos(\varphi_2)\cdot V_1 - \cos(\varphi_1)\cdot V_2}{\sin(\varphi_1)\cdot V_2 - \sin(\varphi_2)\cdot V_1}\right]. \quad (16)$$

17. A method for determining the angular orientation of a rotatable flow control element of a valve, the method comprising the steps of:

(a) coupling at least one magnet to the rotatable flow control element, the magnet being rotatable with the rotatable flow control element and operable to present a magnetic field;

(b) locating a first sensor so as to provide it with an angular orientation $\phi_1$ relative to a reference axis, and operable to detect the apparent strength of the magnetic field and to produce a signal $V_1$ which is indicative thereof;

(c) locating a second sensor so as to provide it with an angular orientation $\phi_2$ relative to the reference axis, and operable to detect the apparent strength of the magnetic field and to produce a signal $V_2$ which is indicative thereof;

(d) determining the angular orientation of the magnet and thereby the rotatable flow control element using the following formula, where the angular orientation of the rotatable flow control element is $\theta_v$, $$\theta_v = \arctan\left[\frac{\cos(\varphi_2)\cdot V_1 - \cos(\varphi_1)\cdot V_2}{\sin(\varphi_1)\cdot V_2 - \sin(\varphi_2)\cdot V_1}\right]. \quad (16)$$

18. The method of claim 17, step (a) including the step of locating the magnet internally of the valve body.

19. The method of claim 17, steps (b) and (c) including the steps of locating the first and second sensors externally of the valve body.

20. A valve comprising:

a valve body including walls defining an internal flow path extending between inlet and outlet openings;

a flow control element rotatably positioned within the flow path; and an angular position sensor comprising
at least one magnet fixed relative to the flow control element, the magnet being rotatable with the flow control element and operable to present a magnetic field,
a first sensor located so as to provide it with an angular orientation $\phi_1$ relative to a reference axis, and operable to detect the apparent strength of the magnetic field and to produce a signal $V_1$ which is indicative thereof;
a second sensor located so as to provide it with an angular orientation $\phi_2$ relative to the reference axis, and operable to detect the apparent strength of the magnetic field and to produce a signal $V_2$ which is indicative thereof;
an electric circuit operable to determine the angular position of the magnet and thereby the flow control element using the following formula, where the angular orientation of the rotatable element is $\theta_v$, $$\theta_v = \arctan\left[\frac{\cos(\varphi_2)\cdot V_1 - \cos(\varphi_1)\cdot V_2}{\sin(\varphi_1)\cdot V_2 - \sin(\varphi_2)\cdot V_1}\right]. \quad (16)$$

21. The valve of claim 20, the magnet being located inside of the of the valve body.

22. The valve of claim 20, the magnet being operable to present a magnetic field outside of the valve body and the first and second sensors being located outside of the valve body.

* * * * *

UNITED STATES PATENT AND TRADEMARK OFFICE
CERTIFICATE OF CORRECTION

PATENT NO.     : 6,244,296 B1
DATED          : June 12, 2001
INVENTOR(S)    : Lafler et al.

It is certified that error appears in the above-identified patent and that said Letters Patent is hereby corrected as shown below:

<u>Title page,</u>
Item [75], change "DiEullis" to -- DiEuliis --.

Signed and Sealed this

Sixteenth Day of July, 2002

Attest:

Attesting Officer

JAMES E. ROGAN
*Director of the United States Patent and Trademark Office*